(12) United States Patent
Harris

(10) Patent No.: US 6,606,769 B1
(45) Date of Patent: Aug. 19, 2003

(54) CARABINER FOR USE WITH STRAP

(76) Inventor: James A. Harris, 1515 W. 8th St., Wellington, KS (US) 67152

( * ) Notice: Subject to any disclaimer, the term of this patent is extended or adjusted under 35 U.S.C. 154(b) by 0 days.

(21) Appl. No.: 10/125,974

(22) Filed: Apr. 19, 2002

(51) Int. Cl.[7] .......................... A44B 13/00; A45F 5/00; A63B 29/00
(52) U.S. Cl. .................... 24/599.2; 24/164; 24/599.7; 24/601.4; 24/3.6; 224/180
(58) Field of Search .............. 24/599.2, 599.7, 24/601.4, 164, 182, 3.13, 3.6; 224/180; D8/356, 367

(56) References Cited

U.S. PATENT DOCUMENTS

| | | | | |
|---|---|---|---|---|
| 590,933 A | * | 9/1897 | Lueders | 24/599.2 |
| 677,365 A | * | 7/1901 | Morrison | 24/599.7 |
| 738,000 A | * | 9/1903 | Carpenter | 24/599.2 |
| 779,675 A | * | 1/1905 | Steele | 24/599.7 |
| 2,236,207 A | * | 3/1941 | Bowder | 24/3.13 |
| 3,748,703 A | | 7/1973 | Maillocheau | 24/265 |
| 4,095,316 A | * | 6/1978 | Gabriel | 24/599.2 |
| 4,811,467 A | | 3/1989 | Lowe | 24/241 |
| 5,210,914 A | | 5/1993 | Katsma | 24/573.5 |
| D345,688 S | | 4/1994 | McLean | D8/356 |
| 5,361,726 A | | 11/1994 | Harris | 119/797 |
| 5,416,956 A | * | 5/1995 | Rubin | 24/3.13 |
| 5,517,949 A | | 5/1996 | Harris | 119/795 |
| 5,540,367 A | * | 7/1996 | Kauker | 24/3.13 |
| 6,243,922 B1 | * | 6/2001 | Simon | 24/3.6 |

* cited by examiner

*Primary Examiner*—Victor Sakran

(57) ABSTRACT

A carabiner designed for use with strap or webbing is disclosed. The carabiner includes a trimmed feature that is incorporated into a straight portion of the body where strap or webbing can be attached. The strap or webbing can be looped around the trimmed feature and sewn tight, thereby effecting a permanent and slip-free attachment.

4 Claims, 3 Drawing Sheets

Closed Configuration

Open Configuration

Bottom End View

Plan View

Side Profile

Plan View

Side Profile

CARABINER FOR USE WITH STRAP

BACKGROUND OF THE INVENTION

1. Field of the Invention

This invention is in the field of snap link hardware commonly known as a carabiner.

2. Discussion of the Background

A carabiner is a rounded link, having one side that comprises a hinged gate that pivots inward. Carabiners were adapted early on as a mountaineering and climbing accessory, and hence have traditionally been made of aluminum to take advantage of that metal's light weight and high strength attributes. Carabiner-style snap hooks have also been made of steel and high-strength plastic. Numerous descriptions may be found in the U.S. Patent literature, for example Lowe (U.S. Pat. No. 4,811,467), McLean (U.S. Pat. No. Des.345688), and Maillocheau (U.S. Pat. No. 3,748,703).

The ease with which a carabiner attaches to a ring or loop has led to its use in other applications. For example, small and inexpensive carabiners are widely marketed as a key accessory.

Carabiners have traditionally been made in three shapes: oval, D-shaped, and open figure eight. These shapes are designed for use with rope.

Carabiners for use with flat strap are less common. U.S. Pat. No. 5,517,949, by the present inventor, discloses one example. Another example is a mountaineering carabiner disclosed by Katsma (U.S. Pat. No. 5,210,914).

An animal leash incorporating a carabiner has been patented by the present inventor (U.S. Pat. No. 5,517,949). That patent specification discloses a carabiner shape designed specifically to be used with flat strap rather than rope. That shape is a modified oval that incorporates a straight portion around which nylon webbing or other strap material may be sewn. The disclosure of a particular carabiner shape and its advantages for use with strap, as described in U.S. Pat. No. 5,517,949, are pertinent to the present specification, and are incorporated herein by reference.

The marketing and use of the carabiner-style leash disclosed in U.S. Pat. No. 5,517,949 revealed that it would be advantageous to incorporate a feature into the carabiner hardware that would make it impossible (or at least very difficult) to remove the strap from the carabiner. By permanently attaching the strap and carabiner together, theft or loss of the carabiner is not a problem. The theft of the carabiner (i.e. shoplifting) can be a particular problem when the leash is in a retail display. The invention disclosed herein is a carabiner that incorporates a simple feature that permits a permanent attachment of the carabiner to strap or webbing.

The carabiner disclosed herein is also particularly suited for use as a key accessory. The parts in a personal key assemblage can include the keys, a keyring, a carabiner, and a short strap or other means connecting the keyring to the carabiner. By using the carabiner disclosed herein in this assemblage, it is impossible for any of the parts of the assemblage to become inadvertently separated. This greatly reduces the possibility of loss.

The carabiner disclosed by Katsma (U.S. Pat. No. 5,210,914) incorporates an elongated oval eyelet through which strap or webbing is threaded before it is sewn. Katsma's carabiner, therefore, incorporates a feature whereby the strap and carabiner can be permanently attached.

The carabiner invention disclosed herein incorporates a different and more simple feature that enables permanent attachment of the strap to the carabiner.

SUMMARY OF THE INVENTION

The carabiner disclosed herein incorporates two features that make it particularly advantageous for use with strap or webbing. The first feature is the shape of the carabiner; in particular a straight portion that is incorporated into the carabiner to make it especially adapted for use with flat strap. This feature is fully disclosed and described in U.S. Pat. No. 5,517,949.

The second feature is a feature that is added to the straight portion around which strap or webbing is wrapped. This feature is a region of the straight portion that has a reduced cross sectional profile. In the preferred embodiment, this so-called trimmed feature is incorporated by shearing away part of the carabiner material on either side of the carabiner body along a length that corresponds to the width of strap or webbing that is to be used.

The carabiner disclosed herein is typically used with nylon webbing. The webbing is typically attached to the carabiner by wrapping it around the body and then sewing. When attaching webbing to the carabiner of this disclosure, the webbing is wrapped around the trimmed feature. The webbing is then sewn tight at this location. By sewing tight, what is meant is that the webbing is held in tension around the carabiner, and the first stitch is located as close as possible to the carabiner. In practice, this operation can be tooled to be easy and efficient by incorporating on the sewing machine a fixture to which the carabiner is hooked so that it can be precisely located and the webbing pulled into tension before placing the first stitch. A sewing technician of average ability can quickly mass-produce leashes or other products that are consistently tightly-sewn using such a setup.

After the webbing has been tightly sewn around the carabiner at the trimmed feature location, it is for all intents and purposes permanently attached. It cannot move from its location because the tightly sewn loop of webbing will not slide over the adjoining areas of greater cross section. In the preferred embodiment, there are tight-radius bends in the carabiner in either side of the trimmed feature, which, together with the thicker section, make it doubly difficult to work the sewn webbing away from its intended position.

In addition to permanent attachment of the webbing, there is a somewhat intangible, tactile benefit from using the carabiner in the present disclosure in a product such as a leash or key accessory. The benefit is that, when the trimmed portion is properly dimensioned, the thickness of the web-wrapped portion is equivalent to the thickness of the rest of the carabiner. This gives the overall product a trim and consistent look and feel. It is superior to the look and feel of the equivalent untrimmed product because the assembly is thicker and heavier (by the webbing thickness) where the webbing is wrapped around an untrimmed carabiner.

It should be noted that the addition of the trimmed feature does not lessen the pull strength of the carabiner in comparison to the corresponding untrimmed carabiner. That is because the carabiner, whether trimmed or untrimmed, when placed under a rising tension load, ultimately fails at the pin-in-notch location where the free end of the gate engages the body; not at the location where the trimmed feature is placed.

DETAILED DESCRIPTION OF THE PREFERRED EMBODIMENT

Figure 1:
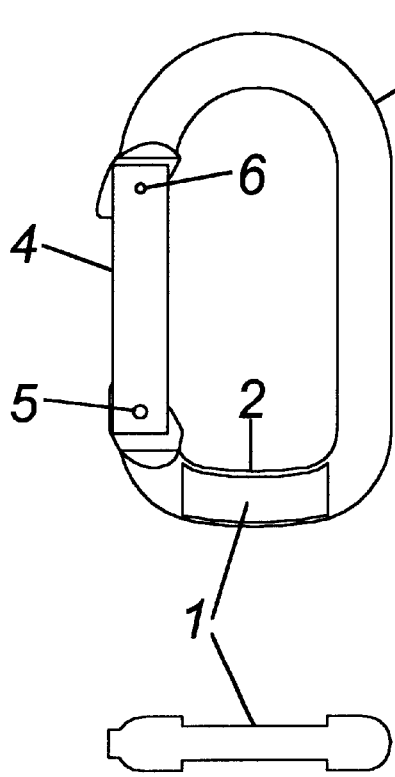
FIG. 1 shows the preferred embodiment in the closed and open positions, and a bottom end view that shows the depth of the trimmed feature.
Figure 1:
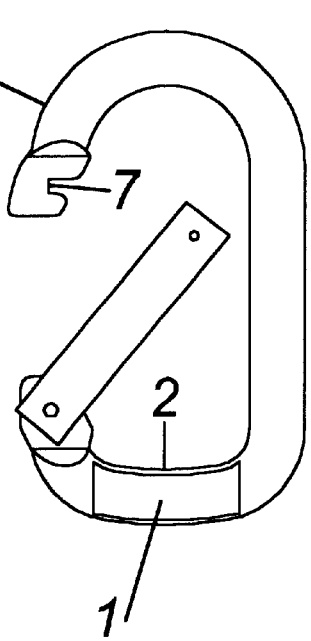

FIG. 1 shows the subject invention in the preferred embodiment. The closed configuration and the open configuration are shown. The bottom end view provides a perspective on the depth of shearing that is appropriate to produce the trimmed feature 1. The trimmed feature is placed in the substantially straight portion 2 of body 3, providing the location where webbing can be tightly sewn.

In the preferred embodiment, the spring-loaded gate 4 pivots inward on hinge pin 5. In the closed position, gate pin 6 engages in notch 7. Note that if there is not a positive engagement means, such as the pin-in-notch design shown, the carabiner is substantially weaker under a tensile load. Hence, the preferred embodiment includes the pin-in-notch closure.

It should be noted that carabiner bodies are typically manufactured by bending straight round stock into the desired shape, and then performing subsequent operations to add logos and lettering, form the ends, drill the hinge hole, etc. In the initial bending operation used to produce the body of the preferred embodiment, there is always some curvature resulting in the so-called straight portion 2 of the body, and that curvature is indicated realistically in FIG. 1. Even though the die around which the workpiece is bent is straight in that location, the workpiece does not conform perfectly to the die. This issue is brought up to elaborate on the term "substantially straight" used to describe this feature. In a practical sense, it is straight enough to adequately serve the purpose of providing an effective attachment location for webbing. The overall conformance of the part is also such that the direction of pulling force, when the carabiner is attached to something, is coaxial with the axis of the webbing. Integral to this conformance are the equivalent "right angles" between the "substantially straight" portion and the sides of the carabiner, these angles actually being tight radius bends that span roughly 90 degrees. The terms "substantially straight" and "right angles" in the context of this specification should not be construed to limit the nature of the invention to an embodiment wherein these terms are interpreted in a strict geometric sense.

FIG. 1 is not scaled, but it shows the correct proportions for large and small carabiners made with 3/8-inch diameter and 5/16-inch diameter bar stock, respectively. The trimmed features are sized for 1-inch and 3/4-inch width webbing respectively.

Figure 2:
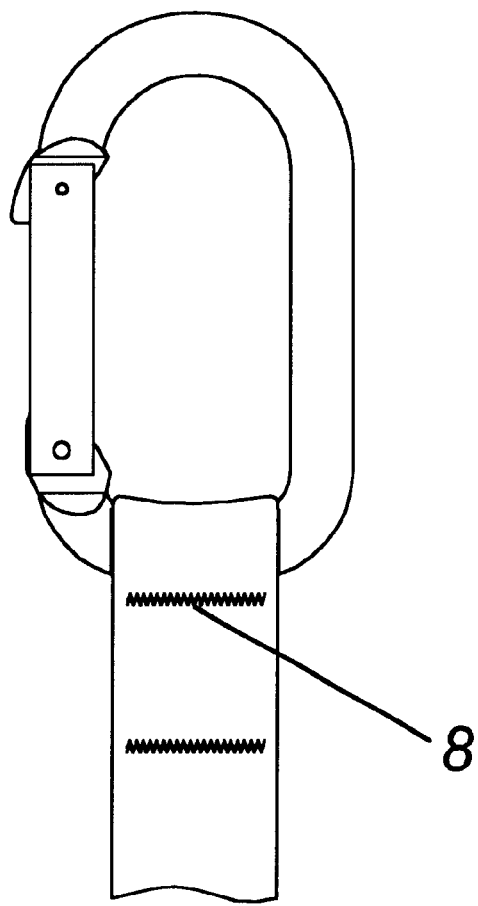
FIG. 2 shows the preferred embodiment with webbing sewn for a leash.
Figure 2:
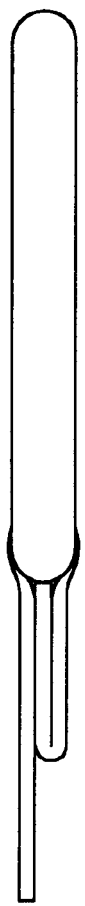

FIG. 2 shows the preferred embodiment as it would be used with webbing attached in a leash application. Stitch 8 is located as close as practicable to the carabiner in order to effect a tight and slip-free attachment of the webbing to the carabiner. The side profile view shows how the trimmed feature results in a uniform front-to-back thickness in the final assemblage.

Figure 3:
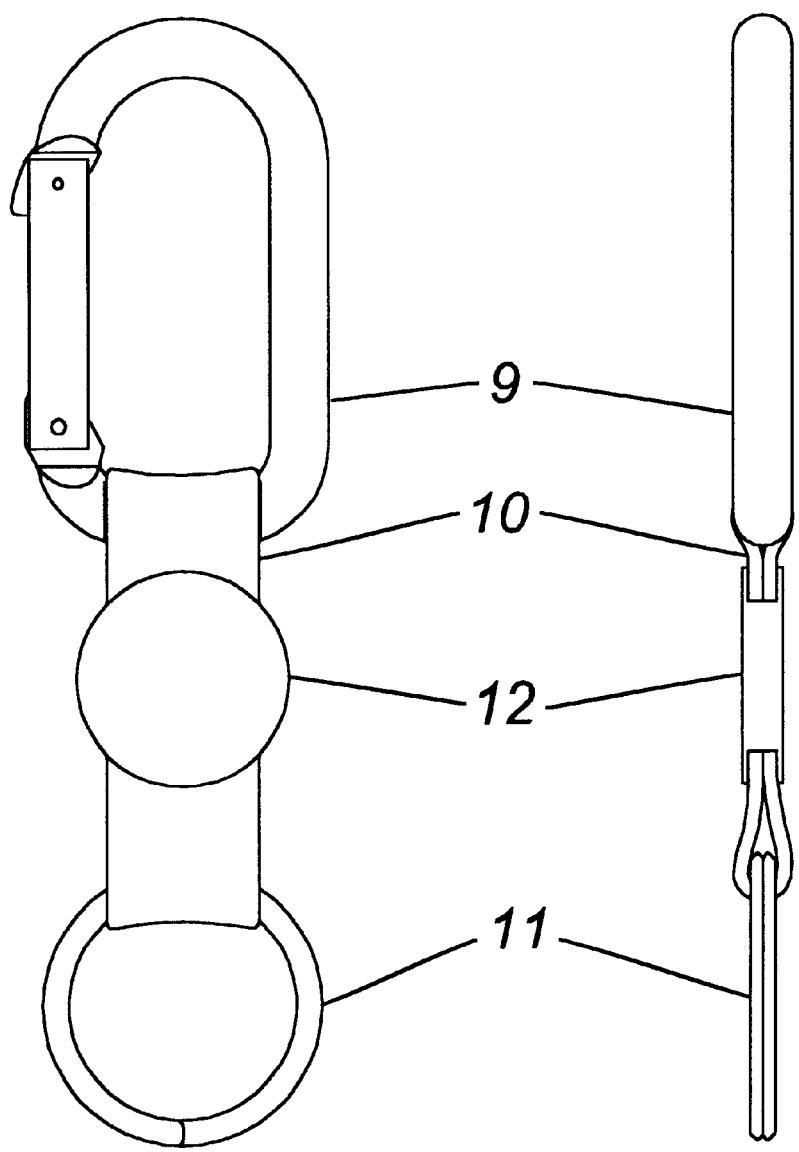
FIG. 3 shows the preferred embodiment in a key accessory assemblage.

FIG. 3 shows the preferred embodiment as it could be used with webbing attached in a key accessory. The components of this assemblage are the carabiner 9, a loop of webbing 10, a keyring 11, and a decorative medallion 12. In addition to providing a place for a logo, the medallion also serves the function of covering the ends of the sewn loop of webbing. In this application, the trimmed feature insures that the carabiner cannot become detached from the assemblage. The trimmed feature also results in the aesthetically pleasing thin side profile shown.

What is claimed is:

1. A carabiner of modified oval geometry, comprising a body and a gate, and incorporating the following features:

two straight and parallel sides, one of which incorporates said gate which is hinged and pivots inward;

a rounded hook end of said body, spanning the straight sides at the free end of the gate;

a substantially straight portion of said body, spanning the straight and parallel sides at the hinged end of the gate and forming substantially right angles with said straight and parallel sides; and a trimmed feature of reduced cross sectional area in a segment of said straight portion;

whereby said trimmed feature provides an attachment location for securing a strap by wrapping said strap around said trimmed feature and then sewing or otherwise securing the strap tightly, thereby establishing a secure and slip-free assembly;

wherein the cross section of said trimmed feature comprises two opposed routed portions and two opposed straight and parallel cords.

2. The carabiner of claim 1 wherein the cross section of said trimmed feature comprises two opposed rounded portions and two opposed straight and parallel chords which in turn are parallel to the plane of the carabiner oval geometry.

3. The carabiner of claim 1 made from aluminum, and wherein the cross section of said trimmed feature comprises two opposed rounded portions and two opposed straight and parallel chords which in turn are parallel to the plane of the carabiner oval geometry.

4. The carabiner of claim 1 made from round aluminum bar, and wherein the cross section of said trimmed feature comprises two opposed rounded portions and two opposed straight and parallel chords which in turn are parallel to the plane of the carabiner oval geometry.

* * * * *

UNITED STATES PATENT AND TRADEMARK OFFICE
CERTIFICATE OF CORRECTION

PATENT NO.     : 6,606,769 B1
DATED          : August 19, 2003
INVENTOR(S)    : James A. Harris It is certified that error appears in the above-identified patent and that said Letters Patent is hereby corrected as shown below:

<u>Column 4,</u>
Line 37, change "routed" to -- rounded --
Line 38, change "cord" to -- chord --

Signed and Sealed this

Fourteenth Day of October, 2003

JAMES E. ROGAN
*Director of the United States Patent and Trademark Office*